United States Patent [19]
Dethardt

[11] Patent Number: 5,373,376
[45] Date of Patent: Dec. 13, 1994

[54] METHOD FOR PROCESSING COLOR VALUES FOR REPRODUCTION SCALE MODIFICATION AND SHAPNESS CORRECTION IN REPRODUCTION OF COLOR ORIGINALS

[75] Inventor: Herbert Dethardt, Schoenkirchen, Germany

[73] Assignee: Linotype-Hell AG, Eschborn, Germany

[21] Appl. No.: 144,579

[22] Filed: Oct. 28, 1993

[30] Foreign Application Priority Data

Oct. 29, 1992 [DE] Germany .............. 4236522
Oct. 15, 1993 [DE] Germany .............. 4335215

[51] Int. Cl.$^5$ .............................................. H04N 1/393
[52] U.S. Cl. ............................... 358/528; 358/500
[58] Field of Search .......... 358/528, 518, 523, 500, 358/505; 382/17

[56] References Cited

U.S. PATENT DOCUMENTS

| | | | |
|---|---|---|---|
| 4,809,083 | 2/1989 | Nagano et al. | 358/528 |
| 4,872,064 | 10/1989 | Tutt et al. | 358/528 |
| 4,958,239 | 9/1990 | Kubota | 358/528 |
| 5,251,022 | 10/1993 | Kitamura | 358/528 |

Primary Examiner—Stephen Brinich
Attorney, Agent, or Firm—Hill, Steadman & Simpson

[57] ABSTRACT

A method and apparatus for processing color values in the reproduction of color originals. Color values ($R_0$, $G_0$, $B_0$) are acquired from original pixels ($P_0$) arranged in an original raster network by pixel-by-pixel and line-by-line, optoelectronic scanning of color originals. For modifying the reproduction scale, an output raster network is generated for output pixels ($P_A$) to be reproduced and the color values ($R_A$, $G_A$, $B_A$) of the output pixels ($P_A$) are respectively calculated from the color values ($R_0$, $G_0$, $B_0$) of the original pixels ($P_0$) within an interpolation window shiftable across the original raster network, being calculated by weighting the color values ($R_0$, $G_0$, $B_0$) with previously calculated weighting coefficients ($k_M$) for the scale modification and by addition of the weighted color values. In order to save calculating time, an image sharpness correction is implemented simultaneously with the modification of the reproduction scale in that surrounding field values ($R_{AU}$, $G_{AU}$ or $B_{AU}$) calculated previously for the surrounding field with an enlarged interpolation window are calculated and further processed. In addition, a color offset correction can also be implemented.

16 Claims, 10 Drawing Sheets

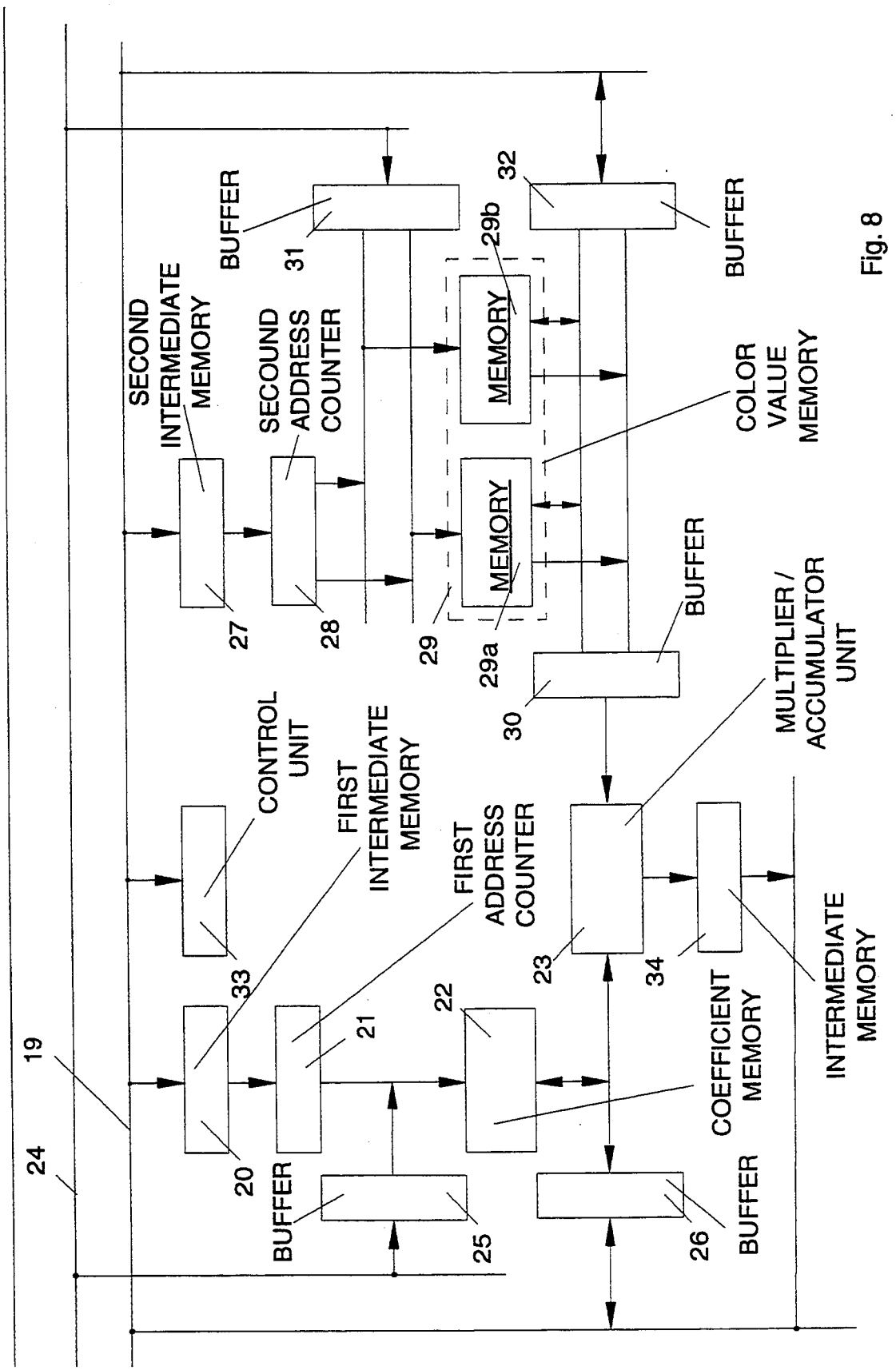

METHOD FOR PROCESSING COLOR VALUES FOR REPRODUCTION SCALE MODIFICATION AND SHAPNESS CORRECTION IN REPRODUCTION OF COLOR ORIGINALS

RELATED APPLICATION

The present application is related to copending application of the same inventor, entitled "METHOD AND APPARATUS FOR PROCESSING COLOR VALUES", Ser. No. 08/144,552, filed Oct. 28, 1993.

BACKGROUND OF THE INVENTION

The invention is in the field of electronic reproduction technology and is directed to a method and to an apparatus for processing color values generated by point-by-point and line-by-line, optoelectronic scanning of color originals in view of a modification of the reproduction scale and in view of a correction of image sharpness.

A point-by-point and line-by-line scanning of a color original is implemented, for example, in a flat bed color image scanner means. Given such a flat bed color image scanner means, the color original to be scanned is arranged on a planar originals carrier that moves continuously relative to an optoelectronic transducer of a scanner unit. The color original to be scanned is illuminated line-by-line with red, green and blue light in alternating fashion, and the scan light that is reflected by the color original or which passes through the color original and is modulated with the color information of the scanned lines is converted into analog color values in the scanner unit.

The scanner unit is essentially composed of a source of scan light, of a rotating filter wheel for the line-by-line separation of the white light produced by the scanner light source into red, green and blue light, and of an optoelectronic transducer, for example of a photodiode line (CCD line), having a following signal editing unit for converting the color components "red", "green" and "blue" acquired line-by-line in the color original into the color values (R, G, B) of the individual pixels in the scan lines. The filter wheel comprises three color-selective segments that have different spectral transmission characteristics for "red", "green" and "blue". The scanner unit is followed by a color value processing unit wherein the analog color values (R, G, B) are converted, for example, into digital color values (R, G, B), are processed for the following processes and are then stored or output on-line.

In the reproduction of color originals, a modification of the reproduction scale in comparison to the scanned color original is often undertaken, for which purpose a multitude of time-consuming calculating operations on the basis of the color values are required in the color value processing.

At the same time, image sharpness corrections (contrast correction) must often be implemented on the basis of an electronic unsharp masking. The contrast, particularly in fine details, is already diminished by comparison to the original in the production of the color original due to unsharpness in film layers as well as due to enlargement and transfer copying. Added thereto is that the resolution of the optoelectronic scanner element of a color scanner is limited due to stray light and unsharpness of the scanner objective, as a result whereof an additional reduction in contrast occurs in the reduction, the observer's eye interpreting this as unsharpness.

There is therefore the necessity of restoring the reduced contrast or, respectively, the reduced image sharpness in the processing of the color values, or to even enhance them in comparison to the original for editorial reasons.

In the image sharpness correction on the basis of electronic unsahrp masking, a surrounding field value is first calculated for every current pixel from the color values of a field surrounding the current pixel, the difference between surrounding field value and color value of the current pixel is formed, and the differential value is added to the color value of the current pixel to a selectable degree as a sharpness correction value. Further time consuming calculating operations are thus required for image sharpness correction.

Due to the substantial number of color values that are to be processed in a modification of scale, there is the problem that an additional image sharpness correction could previously not be implemented in a satisfactory way without considerably exceeding the time available for the scale calculation and, thus, without disadvantageously reducing the speed in the color value processing.

Given employment of a filter wheel in the optoelectronic scanner unit, the color components "red", "green" and "blue of the color original are successively scanned line-by-line due to the continuous relative motion between the optoelectronic transducer and the color original.

Disturbing color offsets arise due to this sequential color scanning in the individual scan lines of the color original, since respectively only one color component is directly acquired for the individual pixels of a current scan line.

For improving the reproduction quality, it is already known to implement a color offset correction in that the lacking color values of the pixels of a scan line are respectively calculated from the color values of the neighboring scan lines. Further time-consuming calculating operations are required for the correction of these color offsets.

SUMMARY OF THE INVENTION

It is therefore an object of the present invention to improve a method and an apparatus for processing color values generated by point-by-point and line-by-line, optoelectronic scanning of color originals such that both modifications of the reproduction scale as well as image sharpness corrections can be implemented with high working speed and precision.

According to a method and apparatus of the invention for processing color values in reproduction of color originals, color values of original pixels representing color components and which are arranged in an original raster network, are acquired by pixel-by-pixel and line-by-line, opto-electronic scanning of color originals and are stored. An output raster network corresponding to the respective reproduction scale is generated for output pixels to be reproduced for modifying the reproduction scale in comparison to the color originals, said output raster network being generated by calling in the color values of the original pixels lying within the shifted interpolation window. The color values are weighted with the weighting coefficients of the interpolation category corresponding to the identified subfields, and the weighted color values are added in order to obtain the color values of the corresponding output pixel in the output raster network. To generate the output raster network, a field is defined in the original raster network and is sub-divided into sub-fields that represent interpolation categories. An interpolation is defined around the category field, the interpolation window covering as many original pixels of the original raster network as color value triads participate in the calculation of the color value triad of an output pixel. A plurality of weighting coefficients corresponding in number to the plurality of original pixels within the interpolation window are identified for every interpolation category of the category field before the color value processing. The respective distance of the sub-area representing the corresponding interpolation category from the individual original pixels within the interpolation window is determined, and a weighting coefficient that corresponds to the distance is calculated from a weighting function for every original pixel within the interpolation window. The calculated sets of weighting coefficients are addressably allocated to the individual sub-fields or interpolation categories. The color value processing of the category field, including the interpolation window, is shifted over the original raster network until a respective outer pixel of the output raster network lies within the shifted category field. The sub-field into which the corresponding output pixel falls is identified. An image sharpness correction is simultaneously implemented with the modification of the reproduction scale.

The invention shall be set forth in greater detail below with reference to FIGS. 1 through 9.

BRIEF DESCRIPTION OF THE DRAWINGS

FIG. 8 is a more detailed block circuit diagram of a color value processing unit.

DESCRIPTION OF THE PREFERRED EMBODIMENTS

Figure 1:
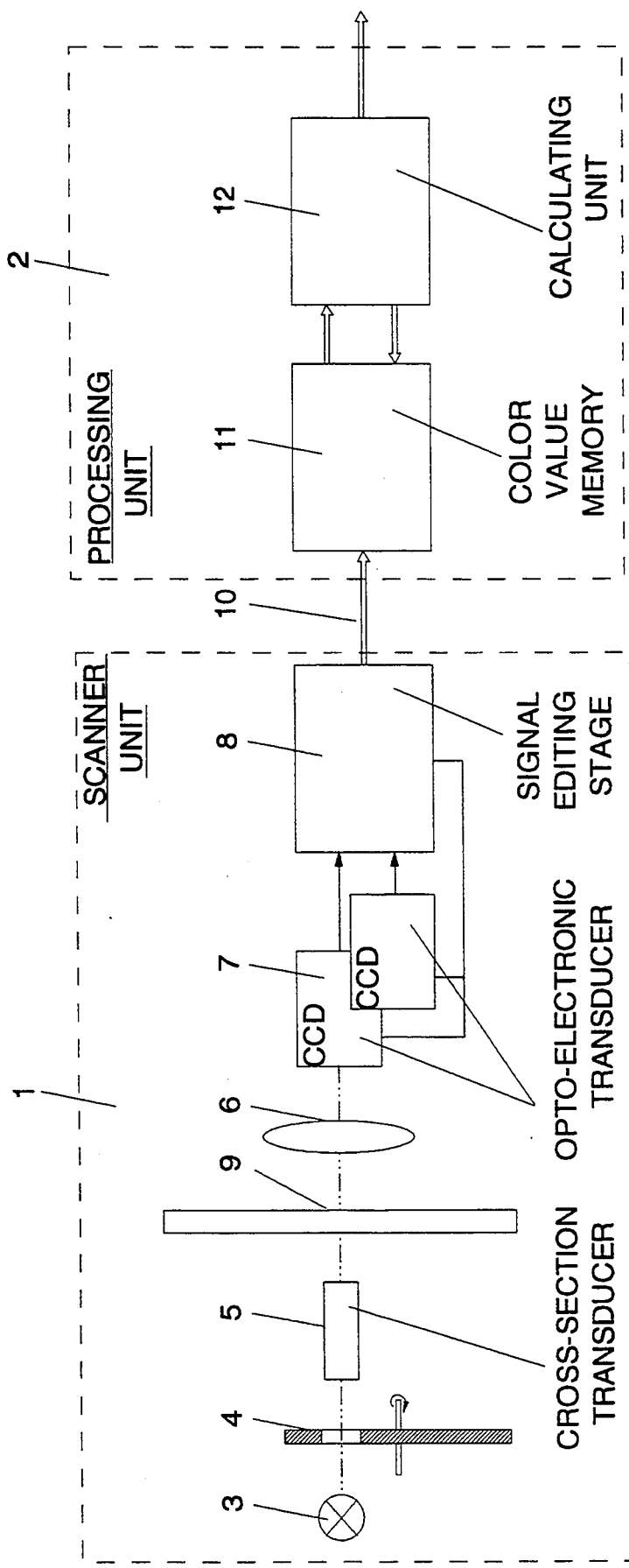
FIG. 1 is a fundamental block circuit diagram of an apparatus for optoelectronic scanning of color originals and for processing the color values acquired by the scanning of the originals.

FIG. 1 shows a schematic block circuit diagram of an apparatus for the optoelectronic scanning of color originals and for processing the color values acquired by the scanning of the originals with respect to a modification of the reproduction scale, an image sharpness correction and, potentially, an additional color offset correction set forth with reference to the example of a flat bed color scanner.

The apparatus is composed of a scanner unit 1 and of a following color value processing unit 2.

The scanner unit 1 comprises a scan light source 3, a rotating filter wheel 4, a cross section transducer 5, a scanner objective 6, an optoelectronic transducer 7, and a following signal editing stage 8. The white light generated by the scan light source 3 is sequentially resolved by the filter wheel 4 into red, green and blue light. For illuminating a color original 9, the sequentially resolved light is imaged on the color original 9 with the assistance of the cross section transducer 5, being imaged as a light band oriented in the line direction. The color original 9 is clamped on a planar originals carrier (not shown) that moves continuously relative to the optoelectronic transducer 7. The filter wheel 4 comprises three color-selective segments, each of which has a respectively different spectral transmission characteristic for "red", "green" and "blue". The optoelectronic transducer 7 is composed, for example, of a one-dimensional photodiode line (CCD line) for pixel-by-pixel resolution of the scan lines. The photodiode line converts the color components "red", "green" and "blue" of the pixels that are acquired line-by-line and sequentially from the color original 9 into electrical color signals. The pixel spacing in the line direction is defined by the spacing of the sensor elements on the photodiode line and by the imaging scale with which the scanner objective 6 images a scan line onto the photodiode line. Given employment of a scanner objective 6 that, for example, respectively images 250 mm or, respectively, 92 mm of a scan line onto a sensor element, a pixel spacing within the scan lines of approximately 41 micrometers or, respectively, 15 micrometers results. The spacing of the scan lines is dependent on the relative speed between optoelectronic transducer 7 and color original 9.

The analog color signals produced by the optoelectronic transducer 7 are converted into digital color values (R, G, B) in the signal editing stage 8 by analog-to-digital conversion. The top sequences for reading out the CCD lines are also generated in the signal editing stage 8 and a correction of the color values is also undertaken therein. A correction of the color values is required because the individual sensor elements of the CCD line have different sensitivities and the luminesce intensity of the light band is not constant over an entire scan line.

The color values (R, G, B) produced in the scanner unit 1 are supplied via an image data bus 10 to the color value processing unit 2 for further-processing.

The color value processing unit 2 is essentially composed of a color value memory 11 for depositing the color values (R, G, B) acquired in the scanner unit 1 and of a calculating unit 12. The color values (R, G, B) for a plurality of scan lines of the scanned color image 9 are intermediately stored in the color value memory 11 addressable point-by-point and line-by-line. Preferably, the color values R, the color values G and the color values B are deposited in separate memory areas of the color value memory 11. The inventive method for color value processing with respect to a modification of the reproduction scale and/or a color offset correction as well as, potentially, with respect to an additional sharpness correction, is implemented in the calculating unit 12 on the basis of the color values (R, G, B).

The method of the invention shall be set forth below with reference to FIGS. 2 through 7.

The scanning of a color image 9 in the scanner unit 9 occurs according to an orthogonal original raster network that is aligned in the line direction (y-direction; principal scan direction) and in the feed direction of the originals carrier (x-direction; subsidiary scan direction). The scanned original pixels $P_0$ lie in the intersections of the raster lines. The spacing of the original pixels $P_0$ in the line direction is defined by the imaging scale with which the scanner objective 6 images the scan lines onto the photodiode line. The line spacing in the original raster network is prescribed by the speed with which the color original 9 is moved perpendicular to the line direction.

Given a modification of the reproduction scale, the original raster network is converted into an output raster network that is likewise orthogonal and is oriented in the line direction and perpendicularly relative thereto, the output pixels $P_A$ again lying in the intersection of the raster lines therein. The spacing of the output pixels $P_A$ in the line direction and the line spacing in the output raster network is defined by the respective reproduction scale. When the two raster networks are placed on top of one another, the output pixels $P_A$ usually do not coincide with the original pixels $P_0$, but lie within the raster meshes of the original raster network.

In this case, the color values $R_A$, $G_A$, $B_A$ of an output pixel $P_A$ are respectively calculated by interpolation from the color values $R_0$, $G_0$, $B_0$ of the original pixels $P_0$ surrounding the corresponding output pixel $P_A$, in that the color values $R_0$, $G_0$, $B_0$ of the corresponding original pixels $P_0$ are multiplied by weighting coefficients $k_M$ and the color values weighted in this way are added, whereby the weighting coefficients $k_M$ are calculated dependent on the respective spacings of the original pixels $P_0$ utilized for the calculation from the output pixel $P_A$.

Figure 2:
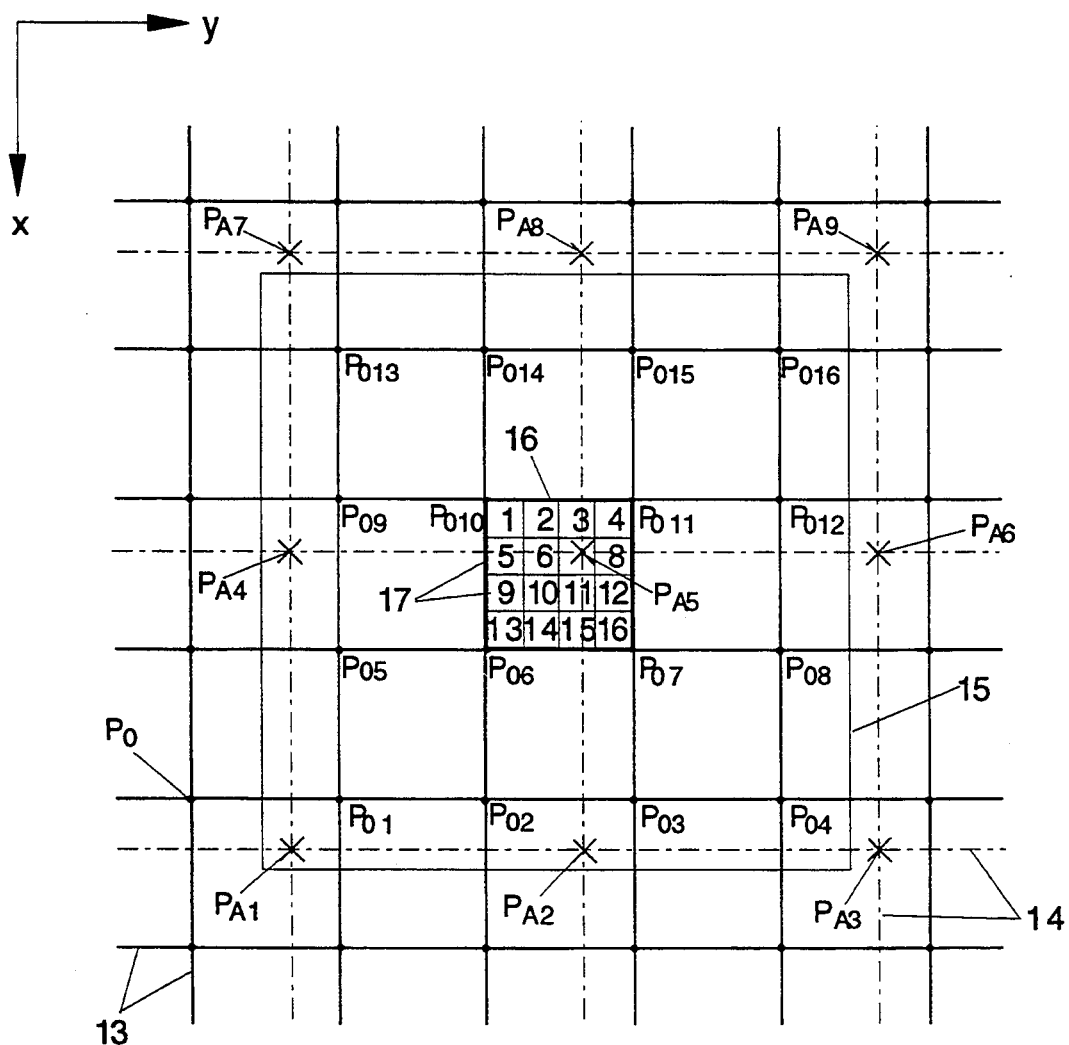
FIG. 2 is a portion from an original raster network and from an output raster network for explaining a modification of the reproduction scale.

FIG. 2 shows a portion of an original raster network 13 having original pixels $P_0$ and a portion from an output raster network 14 generated on the basis of a modification of the reproduction scale and having output pixels $P_A$ that lie within the raster meshes of the original raster network 13.

In case the color original 9 was scanned without color offset, the illustrated raster networks 13, 14 are representative for all three color components "red", "green" and "blue", and a color value triad $R_0$, $G_0$, $B_0$ was acquired in the scanning of the original for every original pixel $P_0$.

In case the color original 9 was scanned with a color offset, the illustrated raster networks 13, 14 are each respectively representative only for one of the color components "red", "green" or "blue", and only one of the three color values $R_0$, $G_0$ or $B_0$ was acquired for every original pixel $P_0$ in the scanning of the original.

For calculating the color values $R_A$, $G_A$, $B_A$ of the output pixels $P_A$, an interpolation window 15 is first inventively defined in the original raster network 13. The interpolation window 15 covers all original pixels $P_0$ whose color values $R_0$, $G_0$, $B_0$ are to be utilized in the calculation of the color values $R_A$, $G_A$, $B_A$ of an output pixel $P_A$. In the illustrated example, the interpolation window 15 covers $4 \times 4$ original pixels $P_{01}$ through $P_{016}$.

Simultaneously, a category field 16 is defined in the center of the interpolation window 15, this category field 16 being subdivided into a plurality of sub-fields 17. The category field 16 has the size of one raster mesh of the original raster network 13, i.e., respectively one original pixel $P_0$, for example the original pixels $P_{06}$, $P_{07}$, $P_{010}$ and $P_{011}$, lies in each of the four corners of the category field 16.

Each sub-field 17 represents one interpolation category IK. A set of weighting coefficients $k_M$ is allocated to each sub-field 17 or to each interpolation category IK. The set of weighting coefficients $k_M$ of an interpolation category IK contains a weighting coefficient k calculated according to a weighting function GF for every original pixel $P_0$ within the interpolation window 15, said weighting coefficient k being dependent on the spacing between the respective original pixel $P_0$ and the interpolation category IK. The size of the interpolation window 15 is dependent on the desired precision in the interpolation and is also dependent on whether a magnification of scale or a diminution of scale is implemented.

The plurality of sub-fields 17 or interpolation categories IK is likewise dependent on the desired precision and is generally selected the same for the color components "red", "green" and "blue".

In the illustrated example, the category field 16 is subdivided into sixteen sub-fields 17 and consequently covers 16 interpolation categories IK=1 through IK=16. Weighting coefficients $k_{n/1}$ through $k_{n/16}$ are allocated to each interpolation category IK=n corresponding to the plurality of original pixels $P_{01}$ through $P_{016}$ in the interpolation window 15.

The sets of weighting coefficients $k_M$ for the individual interpolation categories IK are calculated on the basis of a weighting function GF before the interpolation.

Figure 3:
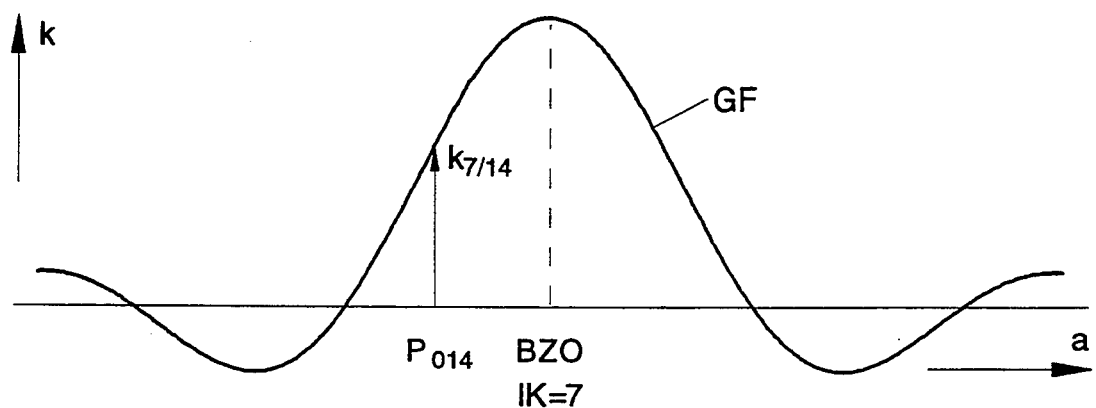
FIG. 3 is a weighting function for calculating weighting coefficients in a one-dimensional presentation.

The Bessel function $J_n(X)$ is preferably employed as weighting function GF. In FIG. 3, for example, the one-dimensional function sin a/a is graphically shown. The distance "a" of an original pixel $P_0$ from a reference location BZ0 wherein the function has its maximum value is entered on the abscissa and the weighting coefficients "k" are entered on the ordinate. The required weighting coefficients $k_M$ of an interpolation category IK can be read directly from the path of the curve dependent on the respective distance of the original pixels $P_0$ from the reference location BZ0, whereby the corresponding interpolation categories IK are respectively selected as reference location BZ0. For example, a weighting coefficient $k_{7/14}$ derives from the curve for the interpolation categories IK=7 and for the original pixel $P_{014}$, whereby "7" indicates the interpolation category IK=7 and "14" indicates the index of the corresponding original pixel $P_{014}$.

The calculated sets of weighting coefficients $k_M$ for the individual interpolation categories IK are expediently deposited in a coefficient memory. The coefficient sets can be called in from the coefficient memory by x,y-addresses that respectively correspond to the locus coordinates (x, y) of the appertaining sub-fields 17 or, respectively, interpolation categories IK within the category field 16.

In the calculation of the color values $R_A$, $G_A$, $B_A$ for the output pixels $P_A$, the category field 16 together with the interpolation window 15 is intellectually shifted step-by-step from raster mesh to raster mesh of the original raster network 13 over the entire area of the color original 9 to be reproduced and an identification is thereby made in every position of the category field 16 to see whether an output pixel $P_A$ of the output raster network 14 lies within the category field 16 or not. When this is not the case, the category field 16 is shifted farther. When, by contrast, an output pixel $P_A$ lies in the category field 16, a determination is first made to see which interpolation category IK this output pixel $P_A$ falls into.

The weighting coefficients $k_M$ of the identified interpolation category IK are then called in and the color values $R_A$, $G_A$, $B_A$ of the corresponding output pixel $P_A$ are calculated in that the color values $R_0$, $G_0$, $B_0$ of the original pixels $P_0$ lying in the interpolation window 15 are multiplied by the allocated weighting coefficients $k_M$ and the weighted color values are accumulated.

In the example shown in FIG. 2, an output pixel $P_A$ falls into the interpolation category IK=7. In this case, the color values $R_0$, $G_0$, $B_0$ of 16 original pixels $P_{01}$ through $P_{016}$ of the interpolation window 15 are to be multiplied by the allocated weighting coefficients $k_{7/1}$ through $k_{7/16}$ of the interpolation category IK=7 and the products are to be added in order to obtain the color values $R_A$, $G_A$, $B_A$ of the output pixel $P_A$:

$$R_A = k_{7/1} \times R_{01} + k_{7/2} \times R_{01} + \ldots + K_{7/16} \times R_{016}$$

$$G_A = k_{7/1} \times G_{01} + k_{7/2} \times G_{02} + \ldots + k_{7/16} \times G_{016}$$

$$B_A = k_{7/1} \times B_{01} + k_{7/2} \times B_{02} + \ldots = k_{7/16} \times B_{016}$$

The calculation of the color values $R_A$, $G_A$, $B_A$ of the output pixels $P_A$ can occur such that respectively all three color values $R_A$, $G_A$, $B_A$ for an output pixel $P_A$ are calculated and a switch is then made to the next output pixel $P_A$. However, the calculation of the color values $R_A$, $G_A$, $B_A$ can also be separately advantageously implemented according to color components, i.e. the color values $R_A$ of all output pixels $P_A$ are first calculated with reference to the color values $R_0$ of the original pixels $P_0$ and the color values $G_A$ and $B_A$ are then correspondingly successively calculated, whereby respectively all three color values $R_A$, $G_A$, $B_A$ of an output pixel $P_A$ are calculated with the same set of weighting coefficients $k_M$.

As already set forth above, the color components "red", "green" and "blue" of the color original 9 are successively scanned line-by-line given the employment of a filter wheel in the scanner unit 1 due to the continuous relative motion between optoelectronic transducer 7 and color original 9, as a result whereof a disturbing color offset arises. It is thereby of no consequence whether the filter wheel chromatically separates the light of the scan light source or the modulated scan light. A color offset, however, occurs not only given employment of a filter wheel in the scanner unit but, for example, also occurs when three differently color-selective photodiode lines that are arranged side-by-side are employed instead of a filter wheel for color separation.

Figure 4:
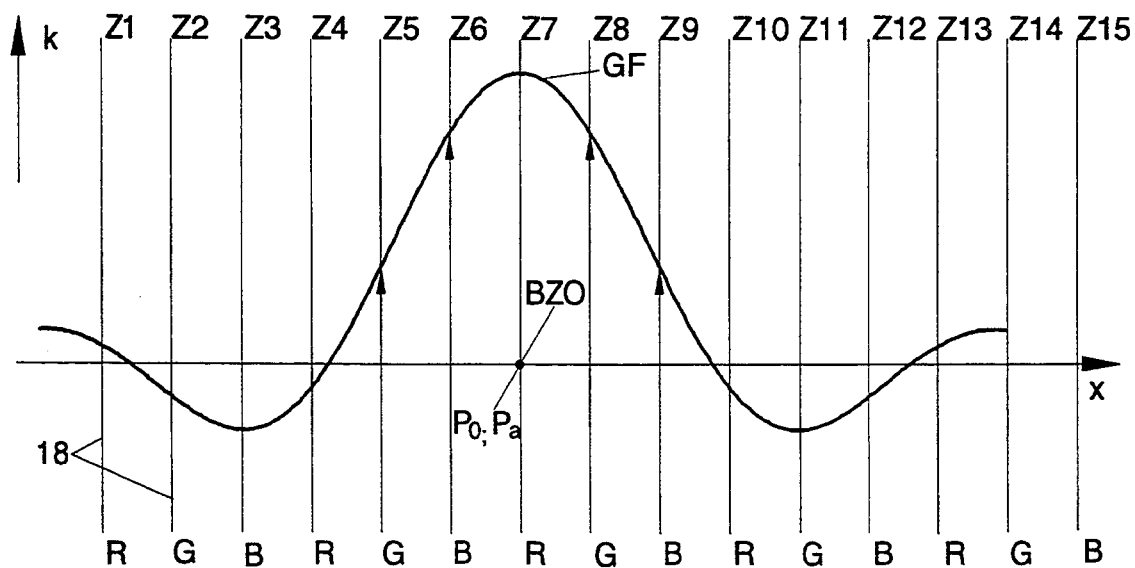
FIG. 4 is a graphic illustration for explaining a color offset correction without modifying the reproduction scale.

A color offset correction is shown in FIG. 4 for that case wherein no simultaneous change of the reproduction scale occurs (M=1:1).

FIG. 4 shows a number of scan lines 18 that lie perpendicular to the feed direction (x-direction). The color components "red", "green" and "blue" were respectively acquired in three successive scan lines 18. For example, the color values $R_0$ were first acquired in the scan line Z8, the color values $G_0$ were subsequently acquired in the scan line Z9, and the color values $B_0$ were acquired in the scan line Z10. Color offsets arise due to this sequential color scanning in the individual scan lines 18, since only the color values of one color component are respectively present for the original pixels $P_0$ of a scan line 18, whereas the corresponding color values of the other two color components are only acquired in the neighboring scan lines 18.

A color offset correction must therefore be implemented for improving the reproduction quality.

Given the reproduction scale of M=1:1, the original raster network 13 and the output raster network 14 are congruent and the output pixels $P_A$ are identical to the original pixels $P_0$.

Given the color offset correction as shown in FIG. 4, only two of the three color values $R_0$, $G_0$ or $B_0$ must be calculated from the color values of the neighboring scan lines 18 for the original pixel $P_0$ in this case since one respective color value is acquired by the scanning.

The calculation of the missing color values $R_0$, $G_0$ or $B_0$ likewise occurs on the basis of a weighting function GF in that corresponding weighting coefficients $k_M$ are derived from the weighting function GF, the weighting coefficients $k_M$ are multiplied by the existing color values $R_0$, $G_0$ or $B_0$ and the products are added.

The same weighting function GF as given a modification of the reproduction scale is expediently employed as weighting function GF in the color offset correction, preferably the Bessel function $J_n(X)$ as well.

The one-dimensional function sin a/a, for example, is again shown as weighting function GF in FIG. 4, whereby "a" is the spacing of the scan lines 18 in x-direction. That pixel $P_0$ or $P_A$ on a scan line 18 whose lacking color values $R_0$, $G_0$ or $B_0$ are to be calculated is respectively selected as reference location BZO. The weighting coefficients $k_M$ for the pixels $P_0$ of $P_A$ required for the calculation can be directly identified in the other scan lines 18 from the course of the curve of the weighting function GF.

In the illustrated example, the scan line Z8 is [the] reference location BZO in which the color values $R_0$ are known. In this case, the color values $G_0$ of the scan line Z8 must be calculated from the known color values $G_0$ of at least the scan lines Z6 and Z9 and the color values $B_0$ of the scan line Z8 must be calculated from the known color values $B_0$ of at least the scan lines Z7 and Z10, being calculated with the assistance of the individual scan lines 18 on the basis of weighting coefficients $k_M$ allocated to the weighting function GF.

The color offset correction set forth in FIG. 4 without modification of the reproduction scale can be advantageously implemented according to the inventive method for color value processing set forth above with reference to FIG. 2, for which purpose an interpolation window 15 and a category field 16 having interpolation categories IK are again employed.

Figure 5A:
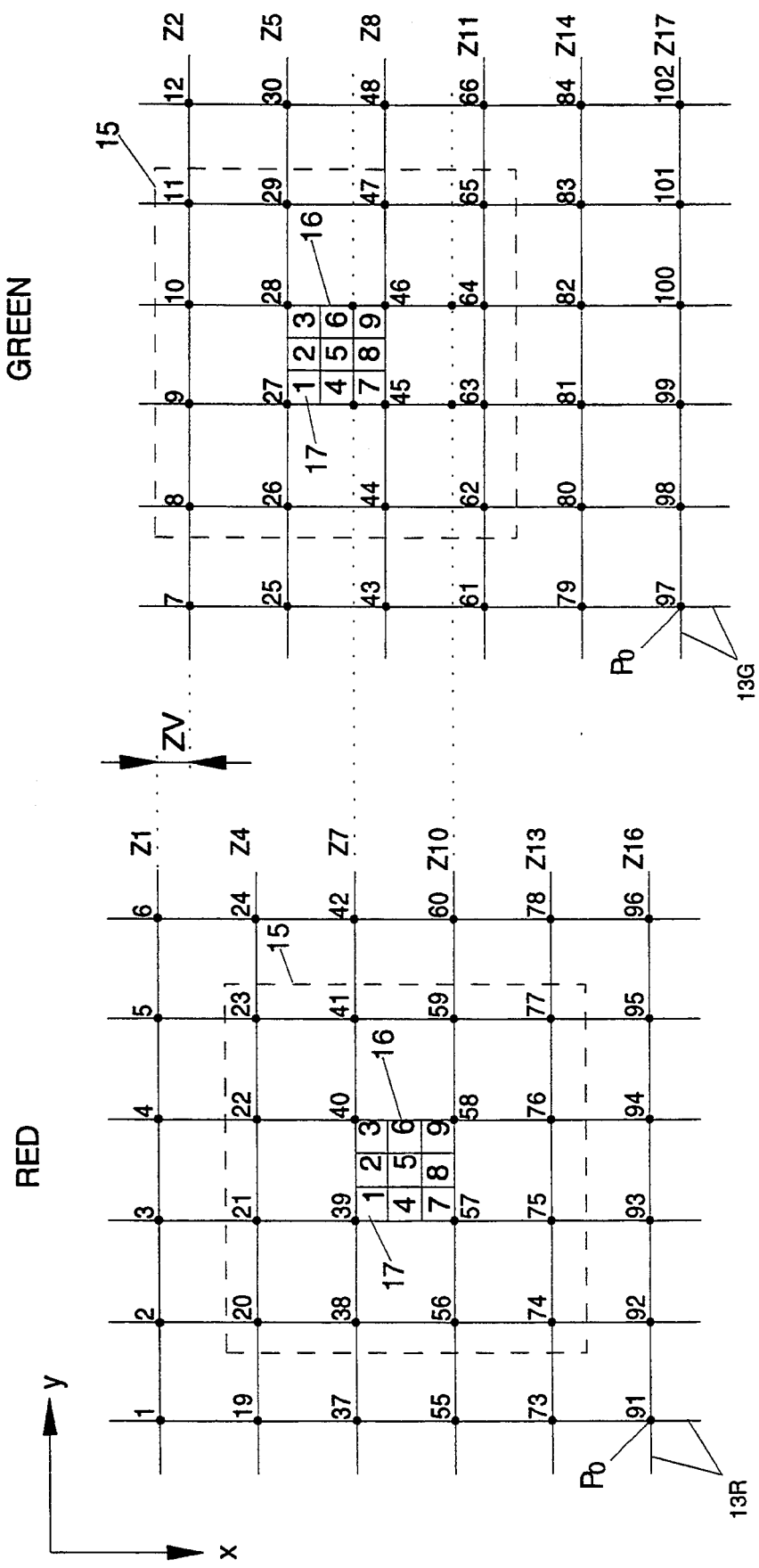
FIG. 5a illustrates portions from original raster networks for the color components "red" and "green" for explaining a color offset correction without modifying the reproduction scale.
Figure 5B:
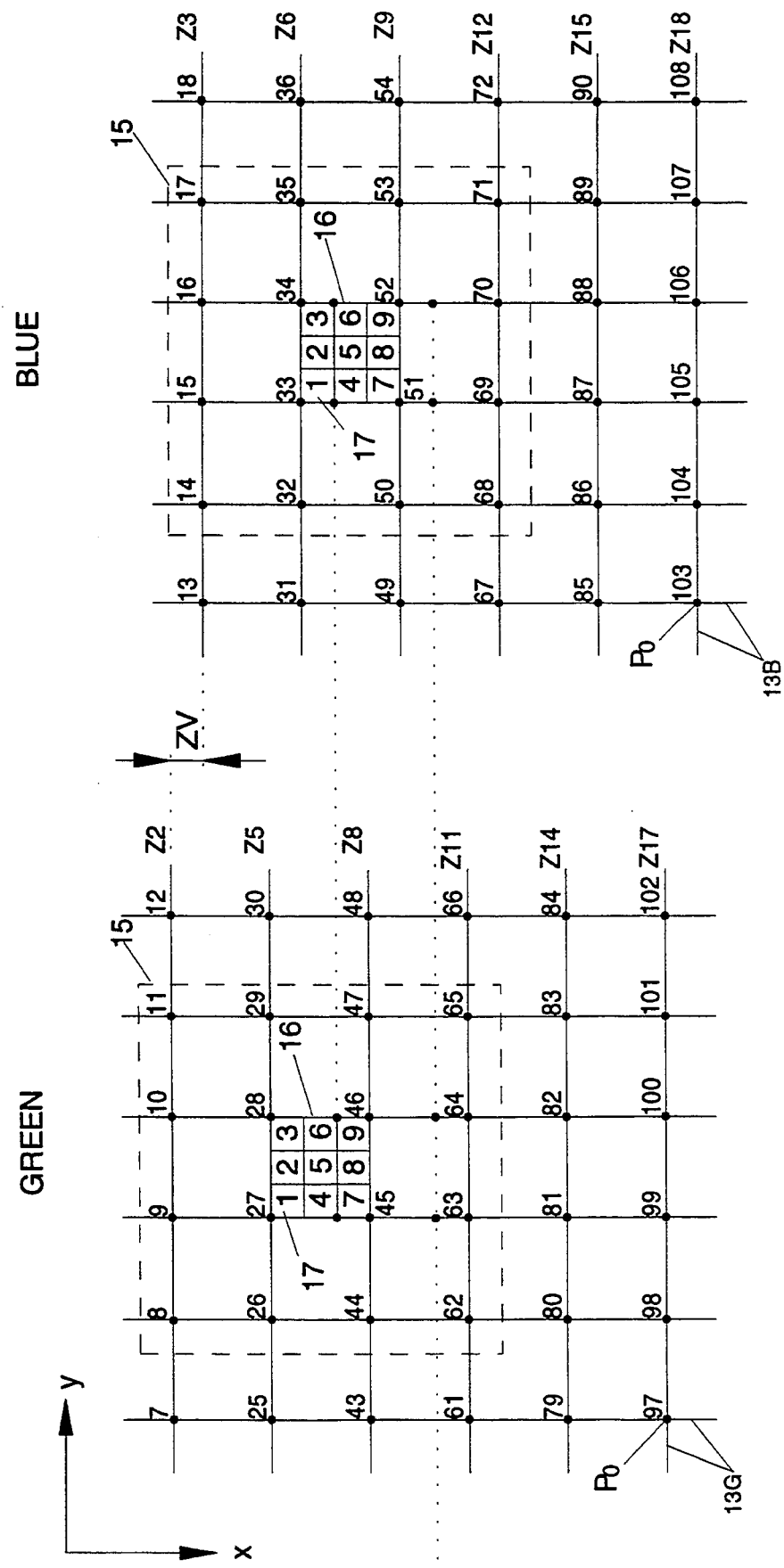
FIG. 5b illustrates corresponding portions from original raster networks for the color components "green" and "blue"

For explaining a color offset correction without modifying the reproduction scale (M=1:1) according to the method of the invention for color value processing, FIG. 5a shows portions from the original raster networks 13R, 13G for the color components "red" and "green" and FIG. 5b shows portions of the original raster networks 13G, 13B for the color components "green" and "blue". Original pixels $P_0$ and output pixels $P_A$ are again identical.

In the scan line Z1, Z4, Z7, Z10, Z13 and Z16, only the color values $R_0$ of the original pixels $P_0$ were acquired in the original raster network 13R for the color component "red"; in the scan lines Z2, Z5, Z8, Z11, Z14 and Z17, only the color values $G_0$ of the original pixels $P_0$ were acquired in the original raster networks 13G for the color component "green"; and, in the scan lines Z3, Z6, 9, Z12, Z15 and Z18, only the color values $B_0$ of the original pixels $P_0$ were acquired in the original raster network 13B for the color component "blue". The original raster networks 13 for the three color components are each respectively shifted relative to one another by the spacing ZV of two scan lines 18 from one another in x-direction.

An interpolation window 15 having 16 original pixels $P_0$ and a category field 16 having, for example, 9 interpolation categories $1K=1$ through $1K=9$ are entered into the original raster network 13R in FIG. 5a for the color constituent "red". The corner points of the category field 17 are the original pixels $P_{039}$ and $P_{040}$ in scan line Z7 and $P_{057}$ and $P_{058}$ in scan line Z10. The color values $R_0$ are known for these original pixels $P_{039}$, $P_{040}$, $P_{057}$ ad $P_{058}$; the color values $G_0$ and $B_0$ must be calculated from the color values $G_0$ of the original raster network 13G for the color component "green" and from the color values $B_0$ of the original raster network 13B of the color component "blue" according to the method for processing color values.

The corresponding original pixels $P_{039}$ and $P_{040}$ on the scan line Z7 as well as $P_{057}$ and $P_{058}$ on scan line Z10 are likewise entered in the original raster networks 13G, 13B for the color components "green" and "blue".

For calculating the color values $G_0$ for the original pixels $P_{039}$ and $P_{040}$ in the scan line Z7, the category field 17 lies between the original pixels $P_{027}$, $P_{028}$, $P_{045}$ and $P_{046}$ of the original raster network 13G for the color component "green". In this position of the category field 16, the original pixel $P_{039}$ falls into the interpolation categories $IK=4$ or, respectively, 7 and the original pixel $P_{040}$ falls into the interpolation categories $IK=6$ or, respectively, 9.

The weighting coefficients $k_M$ allocated to the appertaining interpolation categories IK are called in and are multiplied by the color values $G_0$ of the original pixels $P_{08}$, $P_{09}$, $P_{010}$, $P_{011}$, $P_{026}$, $P_{027}$, $P_{028}$, $P_{029}$, $P_{044}$, $P_{045}$, $P_{046}$, $P_{047}$, $P_{062}$, $P_{063}$, $P_{064}$ and $P_{065}$ lying within the interpolation window 15.

One proceeds correspondingly in the calculation of the color values $B_0$ for the original pixels $P_{039}$ and $P_{040}$ on the scan line Z7 as well as $P_{057}$ and $P_{058}$ on scan line Z10 from the existing color values $B_0$ of the original raster network 13B for the color component "blue". For calculating the color values $B_0$ for the original pixels $P_{039}$ and $P_{040}$ in the scan line Z7, the category field 17 lies between the original pixels $P_{033}$, $P_{034}$, $P_{051}$ and $P_{052}$ of the original raster network 13B for the color component "blue". In this position of the category field 17, the original pixel $P_{039}$ falls into the interpolation categories $IK=1$ or, respectively, 4 and the original pixel $P_{040}$ falls into the interpolation categories $IK=3$ or, respectively, 6. The weighting coefficients $k_M$ allocated to the corresponding interpolation categories IK are again called in and multiplied by the color values $B_0$ of the original pixels $P_{014}$, $P_{015}$, $P_{016}$, $P_{017}$, $P_{032}$, $P_{033}$, $P_{034}$, $P_{035}$, $P_{050}$, $P_{051}$, $P_{052}$, $P_{053}$, $P_{068}$, $P_{069}$ and $P_{071}$ that now lie within the interpolation window 15.

For calculating the color values $G_0$ and $B_0$ for the original pixels $P_{057}$ and $P_{058}$ in the scan line Z10, the category field 16 between the original pixels $P_{045}$, $P_{046}$, $P_{063}$ and $P_{064}$ of the original raster network 13G for the color component "green" or, respectively, between the original pixels $P_{051}$, $P_{052}$, $P_{069}$ and $P_{070}$ of the original raster network 13B for the color component "blue" is shifted and one proceeds correspondingly.

For correcting the color offset of an original pixel $P_0$, thus, the category field 16 including the interpolation window 15 in the original raster networks 13R, 13G, 13B of the three color constituents is respectively shifted by the offset ZV of the scan lines 18 in x-direction, this being realized in the addressing of the coefficient memory by an address modification that corresponds to the offset ZV. As a result of the offset ZV, or as a result of the address modification, the original pixels $P_0$ for which color values are to be calculated in the original raster networks 13R, 13G, 13B of the three color components each respectively fall into a specific, different interpolation category IK defined by the offset VZ in x-direction. As a result thereof, previously calculated weighting coefficients $k_M$ that correspond to the respective offset ZV are utilized for the individual interpolations, as a result whereof, the color offset correction is advantageously implemented with high speed and precision.

Figure 6:
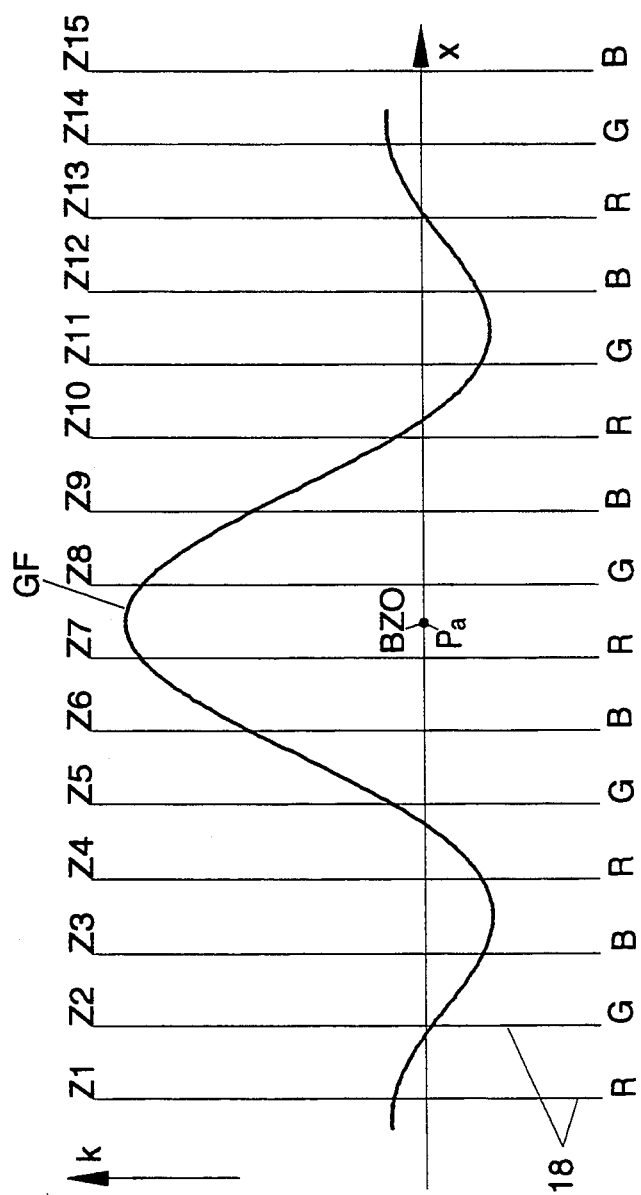
FIG. 6 is a graphic illustration for explaining a color offset correction with modification of the reproduction scale.

A color offset correction in combination with a modification of the reproduction scale is shown in FIG. 6.

Given modification of the reproduction scale, the original raster network 13 and the output raster network 14, as set forth in FIG. 2, are offset relative to one another, and the output pixels $P_A$ lie in the raster meshes of the original raster network 13 or, respectively, between the scan lines 18. In this case, all three color values $R_A$, $G_A$, $B_A$ for every output pixel $P_A$ must be calculated from corresponding color values $R_0$, $G_0$, $B_0$ of the original pixels $P_0$ on the basis of the weighting function GF, whereby the output pixels $P_A$ respectively lying between the scan lines 18 are now selected as reference locations BZ0 of the weighting function GF. In the examples shown in FIG. 6, the color values $R_A$ for the output pixels $P_A$ lying between the scan lines Z8 and Z9 must be calculated from at least the color values $R_0$ of the scan lines Z8 and Z11, the color values $G_A$ must be calculated from at least the color values $G_0$ of the scan line Z6 and Z9, and the color values $B_A$ must be calculated from at least the color values $B_0$ of the scan lines Z7 and Z10.

The color offset correction with modification of the reproduction scale described in FIG. 6 can likewise be advantageously implemented according to the above-described, inventive method for processing color values.

Figure 7A:
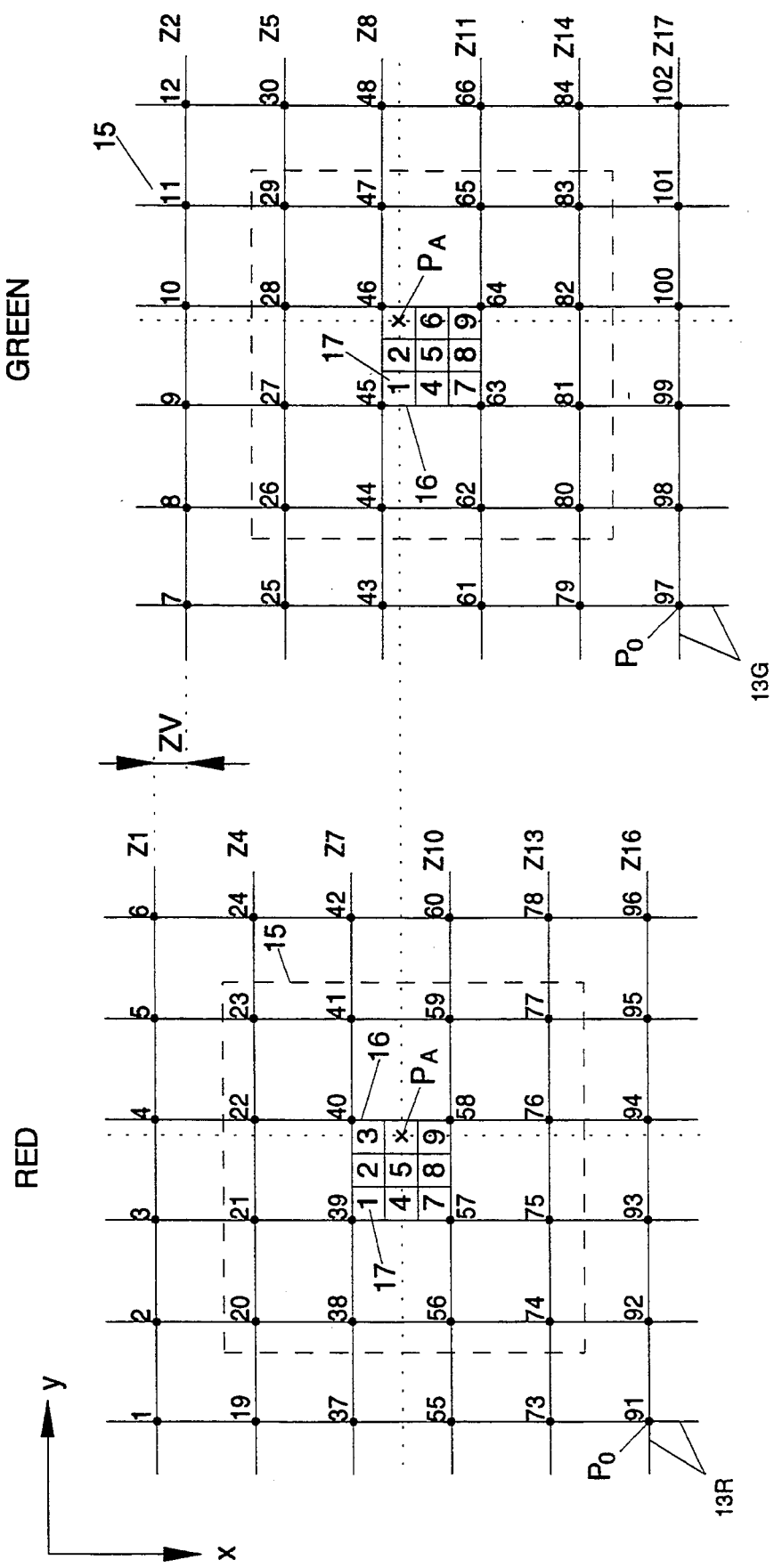
FIG. 7a illustrates portions from original raster networks for the color components "red" and "green" for explaining a color offset correction with modification of the reproduction scale.
Figure 7B:
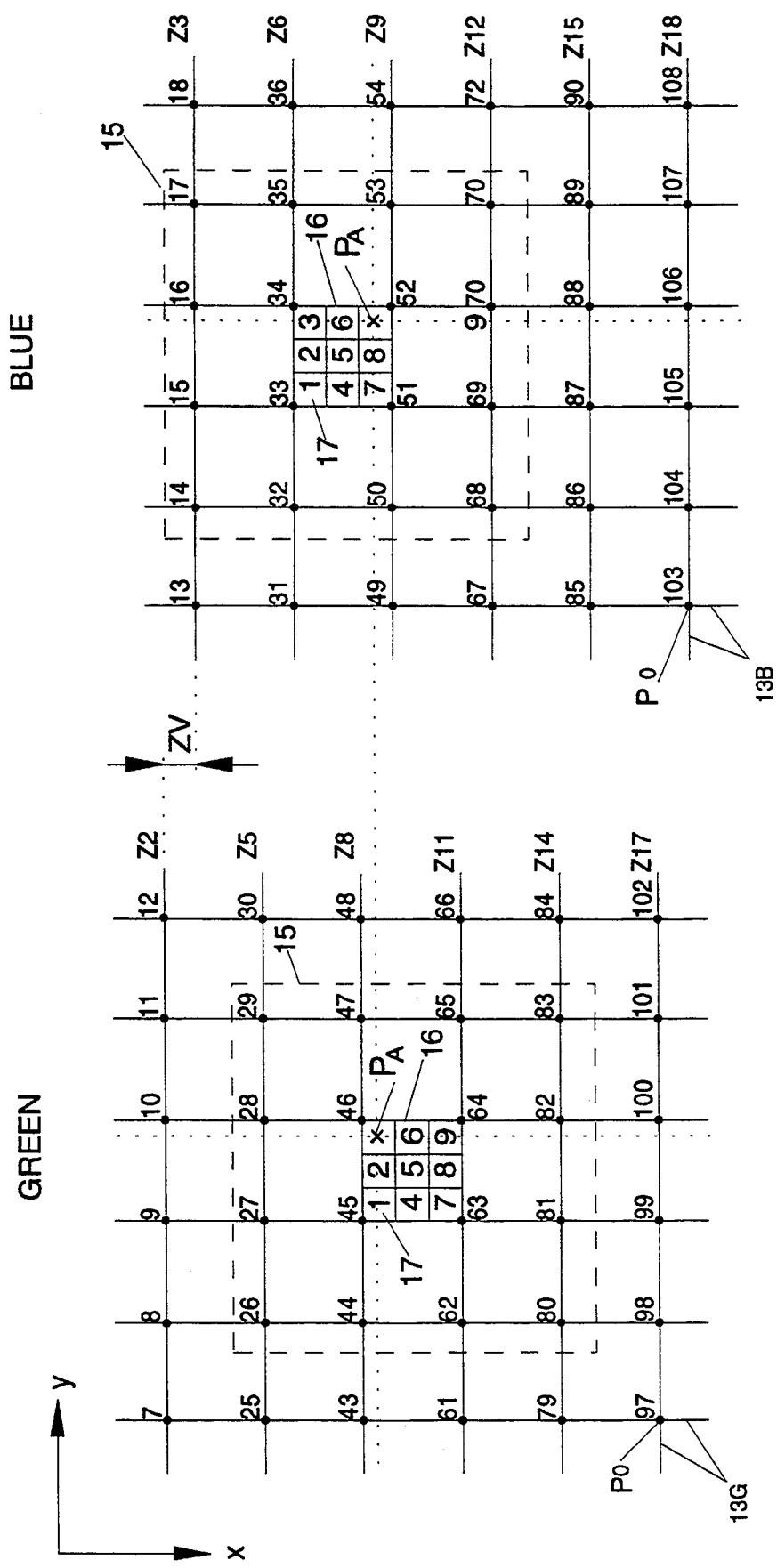
FIG. 7b illustrates corresponding portions from original raster networks for the color components "green" and "red"

For explaining a color offset correction in combination with a modification of the reproduction scale of the method of the invention, FIG. 7a again shows portions from the original raster networks 13R, 13G for the color components "red" and "green" and FIG. 7b shows corresponding portions from the original raster networks 13G, 13B for the color components "green" and "blue".

Due to the color offset in the scan lines Z1, Z4, Z7, Z10, Z13 and Z16, only the color values $R_0$ of the original pixels $P_0$ were again acquired in the original raster network 13R for the color component "red", only the color values $G_0$ of the original pixels $P_0$ were acquired in the original raster network 13G for the color component "green" in the scan lines Z2, Z5, Z8, Z11, Z14 and Z17, and only the color values $B_0$ of the original pixels $P_0$ in the original raster network 13B for the color component "blue" were acquired in the scan lines Z3, Z6, Z9, Z12, Z15 and Z18. The original raster networks 13R, 13G, 13B for the three color components are likewise shifted relative to one another by the spacing ZV of two scan lines 18 from one another in x-direction.

The interpolation window 15 having 16 original pixels $P_0$ and a category field 16 having 9 interpolation categories IK=1 through IK=9 is entered in FIG. 7 into the original raster network 13R for the color component "red". An output pixel $P_A$ of the output raster network 14 (not shown in greater detail) whose position in the three original raster networks 13R, 13G, 13B for the three color components is the same with reference to the x, y coordinates or, respectively, with reference to the color original 9 lies in the raster mesh limited by the original pixels $P_{039}$, $P_{040}$, $P_{057}$ and $P_{058}$.

The color values $R_A$, $G_A$, $B_A$ for this output pixel $P_A$ are to be calculated according to the method of the invention. The interpolation window 15 and the category field 17 are shown in the position wherein the output pixel $P_A$ lies in the category field 16. A determination is then made that the output pixel $P_A$ falls into the interpolation category IK=6 and the corresponding weighting coefficients $k_6$ of the interpolation category IK=6 are called in.

For calculating the color value $R_A$, the weighting coefficients $k_6$ that are called in are then multiplied by the color values $R_0$ of the original pixels $P_{020}$, $P_{021}$, $P_{022}$, $P_{023}$, $P_{038}$, $P_{039}$, $P_{040}$, $P_{041}$, $P_{056}$, $P_{057}$, $P_{058}$, $P_{059}$, $P_{074}$, $P_{075}$, $P_{076}$ and $P_{077}$ that fall into the interpolation window 15.

The output pixel $P_A$ lies in the raster mesh in the original raster network 13G for the color component "green" that is limited by the original pixels $P_{045}$, $P_{046}$, $P_{063}$ and $P_{064}$. A determination is made in this position of the category field 16 that the output pixel $P_A$ falls into the interpolation category IK=3, and the corresponding weighting coefficients $k_3$ of the interpolation category IK=3 are called in.

For calculating the color value $G_A$, the called-in weighting coefficients $k_3$ are then multiplied by the color values $G_0$ of the original pixels $P_{026}$, $P_{027}$, $P_{028}$, $P_{029}$, $P_{044}$, $P_{045}$, $P_{046}$, $P_{047}$, $P_{062}$, $P_{063}$, $P_{064}$, $P_{065}$, $P_{080}$, $P_{081}$, $P_{082}$ and $P_{083}$ that fall into the interpolation window 15.

The output pixel $P_A$ lies in the raster mesh in the original raster network 13B for the color component "blue" that is limited by the original pixels $P_{033}$, $P_{034}$, $P_{051}$ and $P_{052}$. A determination is made in this position of the category field 16 that the output pixel $P_A$ falls into the interpolation category IK=9, and the corresponding weighting coefficients $k_9$ of the interpolation category IK=9 are in turn called in.

For calculating the color value $B_A$, the called-in weighting coefficients $k_9$ are then likewise multiplied by the color values $B_0$ of the original pixels $P_{014}$, $P_{015}$, $P_{016}$, $P_{017}$, $P_{032}$, $P_{033}$, $P_{034}$, $P_{035}$, $P_{050}$, $P_{051}$, $P_{052}$, $P_{053}$, $P_{068}$, $P_{069}$, $P_{070}$ and $P_{071}$ that fall into the interpolation window 15.

For modifying the reproduction scale in combination with a color offset correction for one of the output pixels $P_A$, the category field 16 including the interpolation window 15 is thus likewise shifted in the original raster networks 13R, 13G, 13B of the three color components by the respective offset ZV of the scan lines 18 in x-direction, this being realized in the addressing of the coefficient memory by an address modification corresponding to the offset ZV. As a result of the offset ZV or, respectively, as a result of the address modification, the corresponding output pixel $P_A$ for which the color values $R_A$, $G_A$, $B_A$ are to be calculated at the moment in the original raster networks 13R, 13G, 13B of the three color components respectively falls into a different interpolation category IK, for example into the interpolation categories IK=3, IK=6 and IK=9, which is defined by the offset VZ in x-direction. As a result thereof, weighting coefficients $k_M$ for the scale modification corresponding to the respective offset ZV are utilized, as a result whereof a color offset correction is advantageously simultaneously implemented with a scale modification.

The inventive method for processing color values thus has the advantage that the sets of weighting coefficients $k_M$ calculated for a modification of the reproduction scale can be employed both for a separate color offset correction as well as for a color offset correction implemented simultaneously with a scale modification. A further advantage is comprised therein that no additional calculating time is required for a color offset correction simultaneously implemented with a scale modification and that no additional memory capacity is required for the weighting coefficients $k_M$, since the same coefficient sets are employed for scale modification and color offset correction.

Image sharpness corrections (contrast corrections) must often also be implemented on the basis of an electronic unsharp masking simultaneously with a modification of the reproduction scale. The contrast, particularly in fine detail, is already diminished in the production of the color original by comparison to the original due to unsharpness in the film layers as well as due to enlarging and transfer copying. Added thereto is that the resolution of the optoelectronic scanner element of a color scanner is limited due to stray light and unsharpness of the scanner objective, as a result whereof an additional reduction of contrast occurs in the reproduction of the color original, the eye of the viewer interpreting this as unsharpness. There is therefore the necessity of restoring the diminished contrast or, respectively, the diminished image sharpness in the color value processing or of even enhancing it in comparison to the original for editorial reasons.

In the image sharpness correctness on the basis of electronic unsharp masking, a surrounding field value $F_U$ is first calculated for every current pixel from the color values F of a surrounding field surrounding the current pixel, the differential value $F_D$ of the color value F of the current pixel and the surrounding field value $F_U$ is formed, and the differential value $F_D$ is added to the color value F of the current pixel to a selectable degree as a sharpness correction value in order to obtain the corrected color value $F_K$ according to the equation:

$$F_K = F + c\,(F - F_U).$$

Further, time-consuming calculation operations are thus required for image sharpness correction.

The additional calculating time required for the image sharpness correction can be advantageous shorted in that the image sharpness correction is implemented simultaneously with the modification of the reproduction scale according to the inventive method for color value processing.

For that purpose, the color values $F_A$ ($R_A$, $G_A$ or $B_A$) of the output pixels $P_A$ in the output raster network (14), in what is referred to as the principal field, are first calculated from the color values $F_0$ ($R_0$, $G_0$ or $B_0$) of the original pixels $P_0$ in the original raster network 13 with the weighting coefficients $k_M$ produced for the scale modification, being calculated in a first pass according to the method for scale modification set forth in FIG. 2.

Subsequently, the surrounding field values $F_{AU}$ ($R_{AU}$, $G_{AU}$ or $B_{AU}$) are calculated from the color values of the respective surrounding field around the output pixels $P_A$, for which purpose the size of the interpolation window 15 employed for the scale calculation is correspondingly enlarged.

Given a reduction in scale, the color values $F_A$ ($R_A$, $G_A$ or $B_A$) that have been modified in scale and/or have had their color offset corrected are expediently accessed given a calculation of the surrounding field values $F_{AU}$. The size of the interpolation window 15 for the calculation of the surrounding field is selected, for example, as $3 \times 3$ or $5 \times 5$ original pixels $P_0$ in this case.

Given an enlargement in scale, the color values $F_0$ ($R_0$, $G_0$ and $B_0$) of the original pixel $P_0$ are advantageously accessed in the calculation of the surrounding field values $F_{AU}$, and the size of the interpolation window 15 is selected, for example, as $6 \times 6$ original pixels $P_0$.

Before the calculation of the surrounding field values $F_{AU}$, additional sets of weighting coefficients $k_U$ are calculated for the surrounding field and are likewise stored. The determination of the weighting coefficients $k_U$ expediently occurs according to a modified weighting function GW having a lower limit frequency.

In a second pass, the surrounding field values $F_U$ are calculated from the color values $F_0$ with an interpolation window 15 for the surrounding field that is enlarged in comparison to the interpolation window 15 employed for the scale calculation and with the weighting coefficients $k_U$ for the individual output pixels $P_A$ calculated for the surrounding field. The corrected color values $F_{AK}$ can be determined in accord therewith according to the equation:

$$F_{AK} = F_A + c(F_A - F_{AU})$$

FIG. 8 shows a more detailed block circuit diagram of the color value processing unit 2 for the implementation of the above-explained method steps in a scale modification and/or in a color offset correction.

An image data bus 19 is connected via a first intermediate memory 20 to a first address counter 21. The first address counter 21 addresses a coefficient memory 22 wherein the sets of weighting coefficients $k_M$ for a scale modification or, respectively, for a color offset correction and the sets of weighting coefficients $k_U$ for the calculation of the surrounding field given an image sharpness correction are stored in addressable fashion. The weighting coefficients $k_M$ or $k_U$ respectively addressed are supplied to a first input of a multiplier/accumulator unit 23. A coupling to the image data bus 19 and to an address bus 24 respectively ensues via buffers 25, 26.

The image data bus 19 is also connected via a second intermediate memory 27 to a second address counter 28 that addresses a color value memory 29 wherein the color values $R_0$, $G_0$, $B_0$ produced by the scanner unit 1 are loaded. The color value memory 29 is organized as an alternating reciprocal memory 29a, 29b.

The addressed color values $R_0$, $G_0$, $B_0$ are supplied to a second input of the multiplier/accumulator unit 23 via a buffer 30. Further buffers 31, 32 are provided for connection to the address bus 19 and to the image data bus 24, as well as for supplying data to the multiplier/accumulator unit 23. The execution of the color value processing is controlled by a control unit 33. The multiplication of the color values $R_0$, $G_0$, $B_0$ by the weighting coefficients $k_M$ in case of a scale modification and/or of a color offset correction or by the weighting coefficients $k_U$ in the case of a surrounding field calculation as well as the accumulation of the weighted color values occur in the multiplier/accumulator unit 23. The color values $R_A$, $G_A$, $B_A$ acquired in the multiplier/accumulator unit 23 for the output pixels $P_A$ or the surrounding field values $R_{AU}$, $G_{AU}$, $B_{AU}$ are supplied via a further intermediate memory 34 to the image data bus 19 for further-processing.

Figure 9:
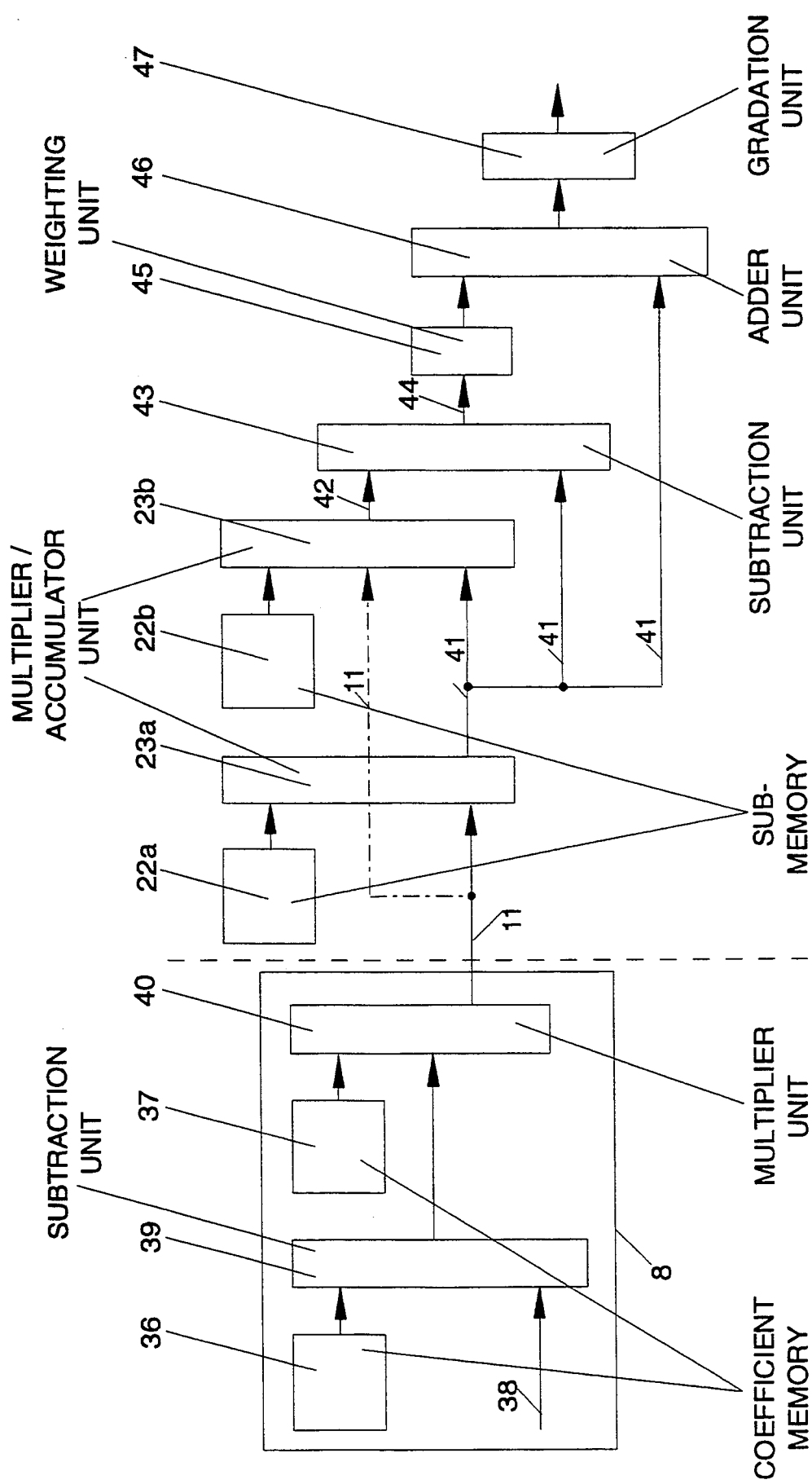
FIG. 9 is a further block circuit diagram for illustrating the method sequences.

FIG. 9 shows another block circuit diagram for illustrating the method steps in a scale modification and/or in a color offset correction and in an additional image sharpness correction.

The signal editing unit 8 already shown in FIG. 1 contains two coefficient memories 36, 37 for the deposit of correction coefficients $K_1$ and $K_2$. The color values supplied from the photodiode lines via a line 38 are corrected by subtraction of correction coefficients $K_1$ in a subtraction unit 39 and by multiplication by correction coefficients $K_2$ in a multiplier unit 40. A correction of the color values $R_0$, $G_0$, $B_0$ is required because the individual sensor elements of the photodiode lines (CCD line) have different sensitivities and the luminesce intensity of the light band is not constant over a scan line.

The corrected color values $R_0$, $G_0$, $B_0$ are supplied to the color value processing unit 2 via the image data bus 11. The calculated weighting coefficients $k_M$ for a scale modification and/or for a color offset correction are deposited in a first sub-memory 22a of the coefficient memory 22. The corrected color values $R_0$, $G_0$, $B_0$ and the weighting coefficients $k_M$ read out from the sub-memory 22a are supplied to the multiplier/accumulator unit 23a that outputs the color values $R_A$, $G_A$, $B_A$ that have been modified in scale and/or have had their color offset corrected onto an image data bus 41.

The weighting coefficients $k_U$ for the surrounding field calculation are deposited in a second sub-memory 22b of the coefficient memory 22. The color values $R_A$, $G_A$, $B_A$ on the image data bus 41 or the color values $R_0$, $G_0$, $B_0$ on the image data bus 11 and the weighting coefficients $k_U$ read out from the sub-memory 22b are supplied to the multiplier/accumulator unit 23b which outputs the calculated surrounding field values $R_{AU}$, $G_{AU}$, $B_{AU}$ on an image data bus 42.

The color values $R_A$, $G_A$, $B_A$ on the image data bus 41 and the surrounding field values $R_{AU}$, $G_{AU}$, $B_{AU}$ on an image data bus 42 proceed onto a subtraction unit 43 wherein the differential value is between color values $R_A$, $G_A$, $B_A$ and surrounding field values $R_{AU}$, $G_{AU}$, $B_{AU}$ are formed. The differential values on an image data bus 44 are weighted in a weighting unit 45 with a weighting factor "c" and are supplied to an adder unit 46 wherein the weighted differential values are added as image sharpness correction values to the color values $R_A$, $G_A$, $B_A$ arriving on the image data bus 41 in order to obtain the color values $R_{AK}$, $G_{AK}$, $B_{AK}$ with corrected image sharpness. The color values $R_{AK}$, $G_{AK}$, $B_{AK}$ with corrected image sharpness are modified in a following gradation unit 47 and are supplied for further-processing.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for processing color values in reproduction of a color original, comprising the steps of:

acquiring by pixel-by-pixel and line-by-line optoelectronic scanning of a color original color values ($R_0$, $G_0$, $B_0$) of original pixels ($P_0$) representing color components arranged in an original raster network, and storing said color values ($R_0$, $G_0$, $B_0$);

for modifying a reproduction scale in comparison to a scale of the original, generating an output raster network corresponding to said respective reproduction scale for output pixels ($P_A$) to be reproduced, color values ($R_A$, $G_A$, $B_A$) of the output pixels ($P_A$) being calculated from the stored color values ($R_0$, $G_0$, $B_0$) of the original pixels ($P_0$);

generating the output raster network by the steps of defining a category field in the original raster network and subdividing it into sub-fields that represent interpolation categories, defining an interpolation window around the category field, the interpolation window covering as many original pixels ($P_0$) of the original raster network as color value triads ($R_0$, $G_0$, $B_0$) participating in calculation of a color value triad ($R_A$, $G_A$, $B_A$) of an output pixel ($P_A$), identifying a plurality, of weighting coefficients ($k_M$) corresponding in number to a plurality of original pixels (P) within the interpolation window for every interpolation category (IK) of the category field before a color value processing, determining a respective distance (a) of a sub-field representing a corresponding interpolation category (IK) from the individual original pixels ($P_0$) within the interpolation window, and calculating a weight-weighting coefficient ($k_M$) that corresponds to a distance (a) from a weighting function (GF) for every original pixel (P) within the interpolation window, addressably allocating calculated sets of weighting coefficients ($k_M$) to the individual sub-fields and corresponding interpolation categories (IK), shifting a color value processing of the category field, including the interpolation window, over the original raster network until a respective output pixel ($P_A$) of the output raster network lies within the shifted category field, identifying the sub-field into which the corresponding output pixel ($P_A$) falls, and calling in the color values ($R_0$, $G_0$, $B_0$) of the original pixels ($P_0$) lying within the shifted interpolation window, weighting them with the weighting coefficients ($k_M$) of the interpolation category (IK) corresponding to the identified sub-fields, and adding the weighted color values in order to obtain the color values ($R_A$, $G_A$, $B_A$) of the corresponding output pixel ($P_A$) in the output raster network; and implementing an image sharpness correction simultaneously with the modification of the reproduction scale.

2. A method according to claim 1 wherein for said image sharpness correction calculating surrounding field values ($R_{AU}$, $G_{AU}$, $B_{AU}$) for every output pixel ($P_A$) from color values ($R_0$, $G_0$, $B_0$) or ($R_A$, $G_A$, $B_A$) of those pixels ($P_0$ or $P_A$) that lie in a surrounding field around the corresponding output pixel ($P_A$);

forming differential values of the color values ($R_A$, $G_A$, $B_A$) and the surrounding field values ($R_{AU}$, $G_{AU}$, $B_{AU}$); and adding the differential values in a selectable degree to the color values ($R_A$, $G_A$, $B_A$) in order to obtain color values ($R_{AK}$, $G_{AK}$, $B_{AK}$) that are corrected with respect to the image sharpness.

3. A method according to claim 2 wherein for calculating the surrounding field values ($R_{AU}$, $G_{AU}$, $B_{AU}$)

defining an interpolation window that is enlarged in comparison to the interpolation window employed for the scale modification and that defines the surrounding field;

calculating weighting coefficients ($k_U$) for the surrounding field for the interpolation categories (IK) of the category field on the basis of a modified weighting function (GF);

shifting the interpolation window for the surrounding field across the corresponding raster network; and calculating the surrounding field values ($R_{AU}$, $G_{AU}$, $B_{AU}$) from the color values ($R_0$, $G_0$, $B_0$ or $R_A$, $G_A$, $B_A$) of the original pixels ($P_0$) respectively lying within the interpolation window and from the weighting coefficients ($k_U$) for the surrounding field.

4. A method according to claim 2 wherein in a scale demagnification, the color values ($R_A$, $G_A$, $B_A$) of the output raster network respectively lying within the interpolation window for the surrounding field are utilized for the calculation of the surrounding field values ($R_{AU}$, $G_{AU}$, $B_{AU}$).

5. A method according to claim 2 wherein, given a magnification of scale, the color values ($R_0$, $G_0$, $B_0$) of the original raster network lying within the interpolation window for the surrounding field are utilized for the calculation of the surrounding field values ($R_{AU}$, $G_{AU}$, $B_{AU}$).

6. A method according to claim 1 including the steps of:

providing the category field with a size of a raster mesh of the original raster network; and shifting the category field step-by-step from raster mesh to raster mesh.

7. A method according to claim 1 including the step of employing a Bessel function Jn(X) as the weighting function (GF).

8. A method according to claim 1 including the further step of storing in callable fashion by addresses which respectively correspond to locus coordinates of the sub-fields in the category field sets of weighting coefficients ($x_M$, $x_U$) allocated to the individual interpolation categories (IK) or sub-fields.

9. A method according to claim 1 wherein the sub-fields of the category field are of a same size for three color components.

10. A method according to claim 1 wherein color components of the original pixels ($P_0$) are sequentially scanned in successive scan lines, as a result whereof only one respective color value of the color value triad ($G_0$, $R_0$, $B_0$) is acquired for each original pixel ($P_0$) of a scan line, and wherein a correction of a color offset which has arisen due to the sequential acquisition of the color components is implemented simultaneously with a modification of the reproduction scale and with an image sharpness correction, said color correction being implemented with assistance of the weighting coefficients ($k_M$) calculated for the scale modification.

11. A method according to claim 10 including the steps of:
resolving the original raster network into raster networks for three color components, each of said raster networks being shifted perpendicularly to a line direction by a distance (ZV) of two scan lines from one another in accordance with the color offset, whereby only one respective color value ($R_0$, $G_0$, $B_0$) is acquired for each original pixel ($P_0$) of a raster network;
shifting the interpolation window and the category field across the raster networks for the three color components; and
respectively calculating the color values ($R_A$, $G_A$ or $B_A$) of the three color components of an output pixel ($P_A$) from the color values ($R_0$, $G_0$ or $B_0$) of the original pixels ($P_0$) in the raster networks for corresponding color components that lie within the interpolation window and from the weighting coefficients ($k_M$) of that interpolation category (IK) into which the output pixel ($P_A$) respectively falls in the raster networks for the corresponding color components.

12. A method according to claim 11 wherein the category field is respectively shifted across the raster networks with the offset (ZV) directed perpendicularly relative to the scan lines for the calculation of the corresponding interpolation category (IK) for the three color components, said offset (ZV) corresponding to the distance of the scan lines from one another.

13. A method according to claim 12 including the steps of:
storing in callable fashion by addresses that respectively correspond to the locus coordinates of the sub-fields in the category field the sets of weighting coefficients ($k_M$, $k_U$) allocated to the individual interpolation categories (IK) or sub-fields; and
identifying the respective interpolation category (IK) for the three color components on the basis of a modified addressing that corresponds to the offset (ZV) by the spacing of the scan lines that is directed perpendicularly relative to the scan lines.

14. An apparatus for processing color values having a scanner unit for point-by-point and line-by-line optoelectronic scanning of color originals, comprising:

a color value processing unit having means for modifying a reproduction scale and for correcting image sharpness; and
said means comprising
a coefficient memory for addressable storing of sets of weighting coefficients ($k_M$) allocated to individual interpolation categories (IK) of a category field for a modification of a reproduction scale and of weighting coefficients ($k_U$) for a correction of image sharpness;
a first address generator for addressing the coefficient memory;
a color value memory for deposit of color values ($R_0$, $G_0$, $B_0$ or ($R_A$, $G_A$, $B_A$) of the pixels ($P_0$ or $P_A$) lying in a respective interpolation window;
a second address generator for addressing the color value memory; and
a multiplier/accumulator unit connected to the coefficient memory and to the color value memory for weighting the color values ($R_0$, $G_0$, $B_0$ or $R_A$, $G_A$, $B_A$) of the pixel ($P_0$ or $P_A$) respectively lying within the interpolation window with a weighting coefficient ($k_M$ or $k_U$) allocated to an interpolation category (IK) and for accumulating the weighted color values.

15. An apparatus according to claim 14 wherein the color value processing unit comprises an additional unit for color offset correction.

16. A method for processing color values in a reproduction of color originals, comprising the steps of:
acquiring color values ($R_0$, $G_0$, $B_0$) from original pixels ($P_0$) arranged in an original raster network by pixel-by-pixel and line-by-line, optoelectronic scanning of color originals;
modifying the reproduction scale by generating an output raster network for output pixels ($P_A$) to be reproduced and calculating color values ($R_A$, $G_A$, $B_A$) of the output pixels ($P_A$) from the color values ($R_0$, $G_0$, $B_0$) of the original pixels ($P_0$) with an interpolation window shiftable across the original raster network;
calculating the color values ($R_A$, $G_A$, $B_A$) by weighting the color values ($R_0$, $G_0$, $B_0$) with previously calculated weighting coefficients ($k_M$) for the scale modification and by addition of the weighted color values;
to save calculating time, simultaneously implementing an image sharpness correction with the modification of the reproduction scale by calculating surrounding field values ($R_{AU}$, $G_{AU}$, $B_{AU}$) calculated previously for the surrounding field with an enlarged interpolation window.

* * * * *